(12) United States Patent
Alevoor et al.

(10) Patent No.: US 12,381,468 B1
(45) Date of Patent: Aug. 5, 2025

(54) AVERAGE INDUCTOR CHARGING CURRENT MEASUREMENT IN A SWITCHED-MODE POWER SUPPLY USING SWITCHED-CAPACITOR CHARGE SHARING

(71) Applicant: CIRRUS LOGIC INTERNATIONAL SEMICONDUCTOR LTD., Edinburgh (GB)

(72) Inventors: Shashank Alevoor, Chandler, AZ (US); Pietro Gallina, Chandler, AZ (US); Abhishek Ray, Chandler, AZ (US); Vivek Parasuram, Tempe, AZ (US); Chanchal Gupta, Chandler, AZ (US); Rosario Pagano, Phoeniz, AZ (US)

(73) Assignee: CIRUS LOGIC, INC., Austin, TX (US)

( * ) Notice: Subject to any disclaimer, the term of this patent is extended or adjusted under 35 U.S.C. 154(b) by 295 days.

(21) Appl. No.: 18/204,595

(22) Filed: Jun. 1, 2023

Related U.S. Application Data (60) Provisional application No. 63/398,419, filed on Aug. 16, 2022.

(51) Int. Cl.
 *H02M 1/00* (2007.01)
(52) U.S. Cl.
 CPC ................................ *H02M 1/0009* (2021.05)
(58) Field of Classification Search
 CPC .................................................... H02M 1/0009
 See application file for complete search history.

(56) References Cited

U.S. PATENT DOCUMENTS

| | | | |
|---|---|---|---|
| 9,812,963 B1* | 11/2017 | Nguyen | H02M 3/1588 |
| 10,044,267 B1* | 8/2018 | Childs | H02M 3/156 |
| 2006/0232256 A1* | 10/2006 | Salerno | H02M 3/33507 323/284 |
| 2016/0261187 A1* | 9/2016 | Deng | H02M 3/1588 |

* cited by examiner

*Primary Examiner* — Alex Torres-Rivera
(74) *Attorney, Agent, or Firm* — Mitch Harris, Atty at Law, LLC; Andrew M. Harris (57) ABSTRACT

Techniques for measuring average inductor charging current in a switched-power circuit avoid incurring measurement delay or a requirement of a complex filter. An inductor charging current measurement circuit coupled to a power output stage of the switched-power circuit measures an average charging current in an inductor of the switched-power circuit using pair of capacitors to sample an output voltage of the power output stage at different cycle times of an inductor current waveform. The measurement circuit includes a switch that connects the pair of capacitors together to provide a measurement indicative of the average inductor charging current by sharing charge between the first capacitor and the second capacitor to provide the measurement voltage. The provided measurement voltage is indicative of an average of an estimated peak and an estimated valley of the inductor current waveform, which may be used to make determinations regarding a magnitude of the load current.

20 Claims, 6 Drawing Sheets

AVERAGE INDUCTOR CHARGING CURRENT MEASUREMENT IN A SWITCHED-MODE POWER SUPPLY USING SWITCHED-CAPACITOR CHARGE SHARING

FIELD OF THE DISCLOSURE

The field of representative embodiments of this disclosure relates to inductor charging current measuring techniques and circuits in switched-mode power supplies, amplifiers and other switched-mode power output systems, and in particular, to a sampled technique for averaging samples of an inductor charging current indication over one or more cycles of a switched-power system.

BACKGROUND

Switched-power circuits are commonly used in power supplies and amplification systems due to high power efficiency and reduced magnetic component weight and size. By switching current at a frequency greater than the frequencies to be reproduced by an amplifier, or by switching energy generally, in the case of switching power supplies, the size of magnetic components is reduced and losses required by linear circuit operation are eliminated.

One of the critical measures made in a switched-power circuit, particularly in inductor-based topologies such as buck and boost converters, once output voltage feedback is employed, is the average inductor charging current of the power output stage. For a buck converter, the average inductor charging current is equal to the load current, and for other topologies, such as boost converters, the load current may be computed from the average inductor charging current and the steady-state duty cycle. In particular, when the switched-power control mechanism includes efficiency controls, such as operating mode selection, information about the output current supplied to a load provides direct information about the instantaneous and average output energy requirements experienced by the switched-power circuit.

While the inductor charging current of a switched-power stage may be directly measured via inclusion of sense resistors, auxiliary windings and the like, such direct measurement typically requires an efficiency sacrifice, since any series element included in the energy storage path typically introduces a loss. Further, such measurement typically requires relatively complex voltage measurement circuits and typically requires a low-pass filter with a long time constant, in order to remove harmonics that affect the accuracy of the measurement, and incur long delay times for reliable measurement results.

Therefore, it would be advantageous to provide a switched-power circuit in which the output current may be determined without introducing inefficiencies and without requiring long delay times to obtain valid measurement results.

SUMMARY

A method and circuit for measuring inductor charging current in a switched-mode power supply without introducing inefficiencies or delays and with low circuit complexity, is provided in a measurement circuit and method.

The circuit is a switched-mode power supply circuit, or another type of power delivery circuit, which includes an output terminal for providing a charging current to charge an inductor or other magnetic energy storage element, and a power output stage coupled to the inductor for generating the charging current. The circuit also includes an inductor charging current measurement circuit coupled to the power output stage for measuring the average inductor charging current. The inductor charging current measuring circuit includes a first capacitor and a first switch that sample an output voltage of the power output stage at a first cycle time of an inductor current waveform of the power supply and a second capacitor and a second switch that sample the output voltage of the power output stage at a second cycle time of the inductor current waveform. The inductor charging current measurement circuit also includes at least one third switch that connects the first capacitor to the second capacitor to provide a measurement voltage indicative of the average inductor charging current by sharing charge between the first capacitor and the second capacitor to provide the measurement voltage. The provided measurement voltage is indicative of an average of the estimated peak and the estimated valley of the inductor current waveform, which is an indication of the average inductor charging current.

The summary above is provided for brief explanation and does not restrict the scope of the claims. The description below sets forth example embodiments according to this disclosure. Further embodiments and implementations will be apparent to those having ordinary skill in the art. Persons having ordinary skill in the art will recognize that various equivalent techniques may be applied in lieu of, or in conjunction with, the embodiments discussed below, and all such equivalents are encompassed by the present disclosure.

DETAILED DESCRIPTION

The present disclosure encompasses systems, circuits and integrated circuits that measure average inductor charging current in switched-mode power supplies or other switched-power circuits, by including an inductor charging current measurement circuit. The inductor charging current measurement circuit is coupled to a power output stage of the switched-power circuit and measures the average inductor charging current using a pair of capacitors to sample an output voltage of the power output stage at different cycle times of an inductor current waveform. The inductor charging current measurement circuit includes a switch that connects the pair of capacitors together to provide a measurement voltage indicative of the average inductor charging current by sharing charge between the first capacitor and the second capacitor to provide the measurement voltage. The provided measurement voltage is indicative of an average of the estimated peak and the estimated valley of the inductor current waveform, which is an indication of the average inductor charging current, which may be used to make determinations about a magnitude of the load current, in order to determine when the switched-power circuit may be changed to/from a low power operating mode.

Figure 1:
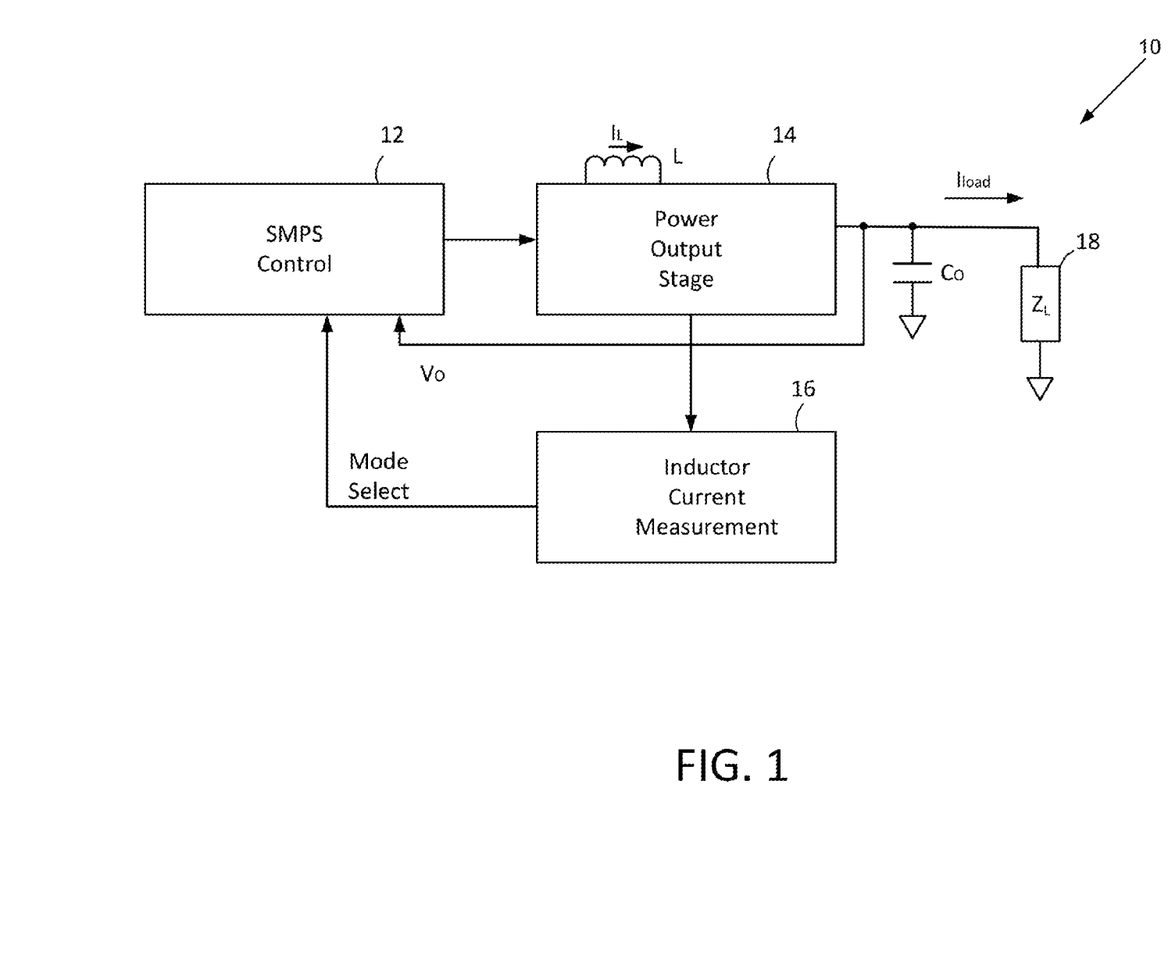
FIG. 1 is a block diagram illustrating an example switched-power delivery system 10, in accordance with an embodiment of the disclosure.

Referring now to FIG. 1, an example switched-power delivery system 10 is shown, in accordance with an embodiment of the disclosure. A switched-mode power supply (SMPS) control block 12 provides switching control signals to a power output stage 14, which is coupled to an inductor L that stores and releases magnetic energy according to the implemented switching topology. A Mode Select control signal may select between different operating modes of SMPS control block 12, for example, between pulse-width modulated (PWM) mode and pulse-frequency modulated (PFM) mode, so that when low output current levels are demanded from the output of example switched-power delivery system 10, which may be detected as a low average inductor current level, PFM operation may be selected. In PFM operation, power output stage 14 is activated by SMIPS control 12 only when energy is needed at the output of example switched-power delivery system 10. Power output stage 14 is coupled to an output capacitor $C_O$ that filters the output of power output stage 14 and to a load 18 represented by an impedance $Z_L$. A voltage feedback loop, which alternatively may be a current feedback loop when load current $I_{load}$ is controlled, rather than output voltage $V_O$, supplies a feedback signal to SMIPS control block 12 to control the pulse-width of the switching control signals provided to power output stage 14 in PWM mode, or to signal when pulse frequency needs to be increased or halted/reduced in PFM mode. An inductor charging current measurement circuit 16 measures characteristics in power output stage 14 to determine when the average inductor charging current is below a reference current threshold, in order to change the state of control signal Mode Select, which causes SMIPS control block 12 to select a low-power high-efficiency operating mode. In general, inductor charging current measurement circuit 16 may sample an indication of the magnitude of a current $I_L$ through inductor L at different times during a switching waveform initiated by SMPS control 12, in order to estimate the average inductor charging current and decide whether or not the average inductor charging current is below the reference current threshold. While the above description and various embodiments illustrated herein are directed to a switched-mode power supply (SMIPS), it is understood that the techniques disclosed herein may be used in other switched-mode power delivery systems, such as Class-D amplifiers.

Figure 2A:
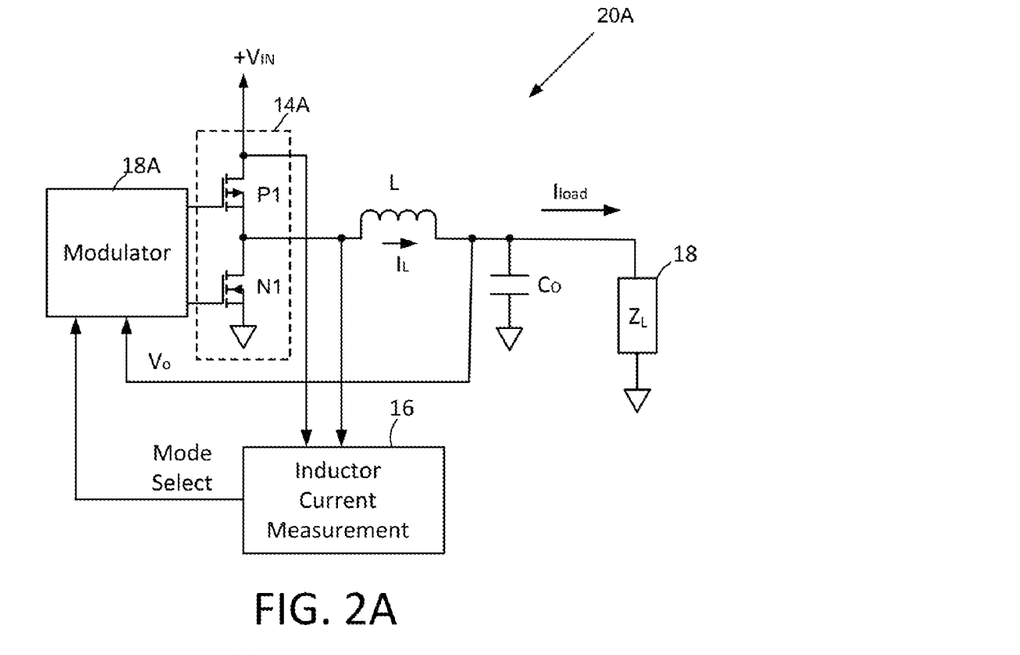
FIG. 2A is a schematic diagram illustrating details of an example buck converter circuit 20A, that may be used to implement example switched-power delivery system 10 of FIG. 1, in accordance with an embodiment of the disclosure.

Referring now to FIG. 2A, a schematic diagram illustrating details of an example buck converter circuit 20A is shown, that may be used to implement example switched-power delivery system 10 of FIG. 1, in accordance with an embodiment of the disclosure. A modulator 18A provides controls signals to activate one of a pair of transistors P1 and N1 of a power output stage 14A and de-activate the other device, so that transistor P1 is activated to charge inductor L in a magnetization phase, and then activate transistor N1 to allow inductor L to charge output capacitor $C_O$ with the stored magnetic energy from inductor L. In both phases of the modulation signals, load current $I_{load}$ is conducted from the output, i.e., the common node of inductor L and output capacitor $C_O$, so that in steady-state operation with a constant load current $I_{load}$, the peak-to-peak range of the voltage waveform at the connection of power output stage 14A with inductor L represents the magnetic energy required to supply current $I_{load}$ over the cycle. Load current $I_{load}$ is also equal to the average inductor charging current over the cycle, so that inductor L is completely demagnetized at the end of the discharge phase, and so that the average of output voltage $V_O$ is constant, i.e., the only variation in output voltage $V_O$ is the ripple produced by the charging and discharging of output capacitor $C_O$ through the equivalent series resistance (esr) of output capacitor $C_O$. As load current $I_{load}$ increases, the peak-to-peak range of the voltage waveform at the connection of power output stage 14A with inductor L increases, and as load current $I_{load}$ decreases, the peak-to-peak range of the voltage waveform at the connection of power output stage 14A with inductor L decreases. Inductor charging current measurement circuit 16 samples the voltage waveform that appears across transistor P1 to provide a measurement that may be compared with a reference, to determine whether or not load current $I_{load}$ is less than a threshold value, and if load current $I_{load}$ is less than the threshold value, signals modulator 18A to enter low-power mode, e.g., PFM mode.

Figure 2B:
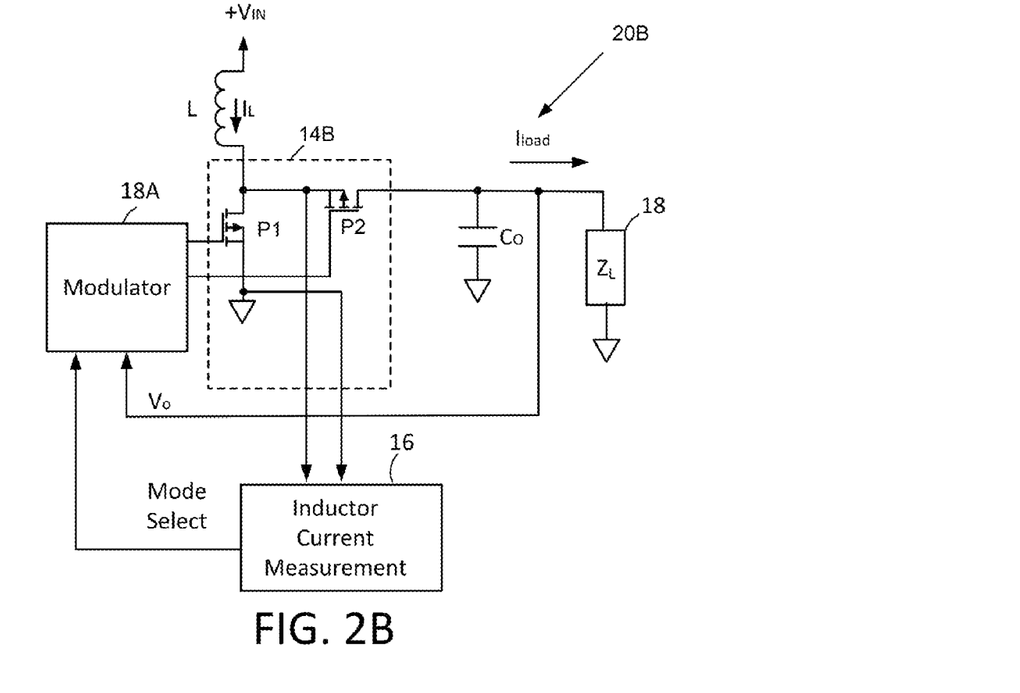
FIG. 2B is a schematic diagram illustrating details of an example boost converter circuit 20B, that may be used to implement example switched-power delivery system 10 of FIG. 1, in accordance with another embodiment of the disclosure.

Referring now to FIG. 2B, a schematic diagram illustrating details of an example boost converter circuit 20B that may be used to implement example switched-power delivery system 10 of FIG. 1 is shown, in accordance with another embodiment of the disclosure. Boost converter circuit 20B is similar to buck converter circuit 20A of FIG. 2A, so only differences in circuit architecture and operation will be described in further detail below. In boost converter circuit 20B, inductor L is coupled between input voltage $+V_{IN}$ and a power output stage 14B. Inductor L is charged when transistor N2 is activated as in buck converter circuit 20A of FIG. 2A, but when transistor N2 is de-activated at the end of the magnetization phase, a transistor N3 is activated to charge output capacitor $C_O$ and since transistor P2 is coupled in series to inductor L, and thus to input voltage $+V_{IN}$, the inductor charging current L generated during de-magnetization of inductor L charges output capacitor $C_O$ to a voltage greater than input voltage $+V_{IN}$, "boosting" input voltage $+V_{IN}$ to a voltage between voltage $V_{IN}$ of input voltage $+V_{IN}$ and $2V_{IN}$. Average inductor charging current may be estimated in the same manner as in buck converter circuit 20A of FIG. 2A, except that the measured average inductor charging current will be scaled by a duty-factor (percentage of on-time) of transistor P1, and therefore any reference to which the measured average inductor charging current is compared must also be scaled. Also, the voltage waveform across transistor P1 is referenced from ground, rather than input voltage +$V_{IN}$.

Figure 3A:
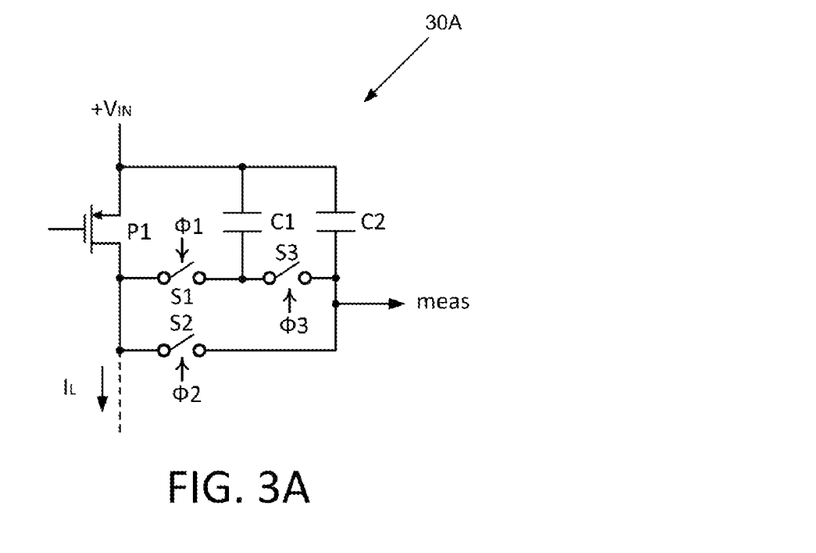
FIG. 3A is a simplified schematic diagram illustrating portions of an example inductor charging current measurement circuit 30A that may be used to implement inductor charging current measurement circuit 16 in example switched-power delivery system 10 of FIG. 1, in accordance with an embodiment of the disclosure.

Referring now to FIG. 3A, a simplified schematic diagram illustrating portions of an example inductor charging current measurement circuit 30A that may be used to implement inductor charging current measurement circuit 16 in the example switched-power delivery system of FIG. 1 is shown, in accordance with an embodiment of the disclosure. Two capacitors C1 and C2 having equal capacitance are charged at different times in the voltage waveform across transistor P1, by activating switches S1 and S2 with two different corresponding sampling clock phases $\Phi_1$ and $\Phi_2$. A third clock phase $\Phi_3$ is active after sampling clock phases $\Phi_1$ and $\Phi_2$ have ended, opening switches S1 and S2, so that the voltages across C1 and C2 correspond to the valley and the peak, respectively of the voltage waveform produced across transistor P1 during the magnetization phase of a switched-power delivery system. The illustrated circuit requires no filtering, as charge sharing between capacitors C1 and C2 during third clock phase $\Phi_3$, caused by activating a switch S3, produces an average of the peak and valley waveform voltages at output meas, at least by the end of third clock phase $\Phi_3$, at which time, output meas may be used as an indication of the average inductor charging current during the switching cycle of the switched-power delivery system. Further, output meas will be valid for every switching cycle.

Figure 3B:
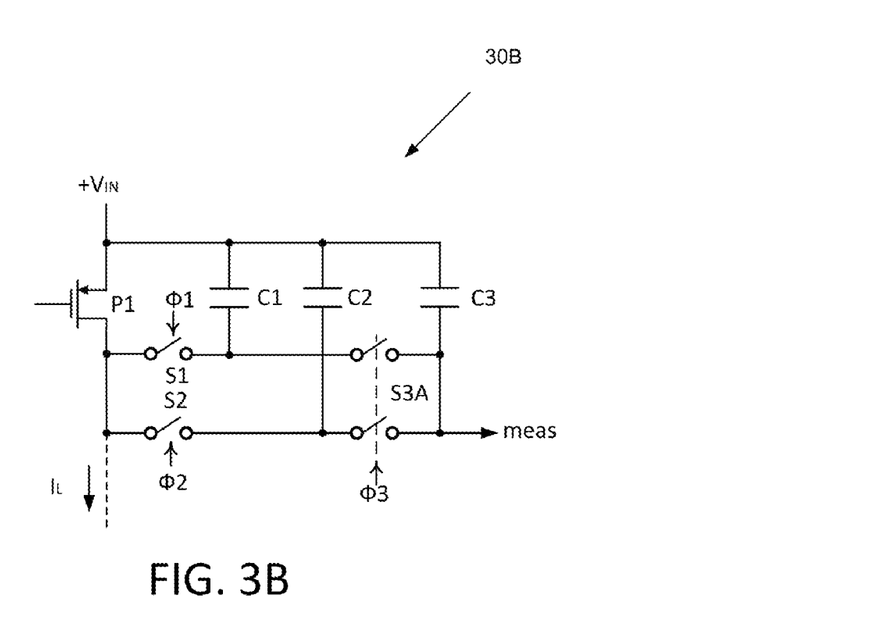
FIG. 3B is a simplified schematic diagram illustrating portions of another example inductor charging current measurement circuit 30B that may be used to implement inductor charging current measurement circuit 16 in example switched-power delivery system 10 of FIG. 1, in accordance with another embodiment of the disclosure.

Referring now to FIG. 3B, a simplified schematic diagram illustrating portions of another example inductor charging current measurement circuit 30B that may be used to implement inductor charging current measurement circuit 16 in the example switched-power delivery system of FIG. 1 is shown, in accordance with another embodiment of the disclosure. Inductor charging current measurement circuit 30B is similar to inductor charging current measurement circuit 30A of FIG. 3A, so only differences in circuit architecture and operation will be described in further detail below. Inductor charging current measurement circuit 30B includes a third capacitor C3 that shares charge with capacitors C1 and C2 during clock phase $\Phi_3$. Capacitor C3 holds the value of output meas between assertions of clock phase $\Phi_3$ and allows for accumulation of the measured indication of average inductor charging current over multiple cycles. If a large capacitance value is chosen for capacitor C3 relative to the capacitances of capacitors C1 and C2, further averaging of the indication of average inductor charging current over multiple cycles may be performed, resulting in further averaging of the average inductor charging current estimate that averages the per-cycle average value of the charging current over multiple cycles of a switched-power delivery system, if such filtering/averaging is desired.

Figure 4:
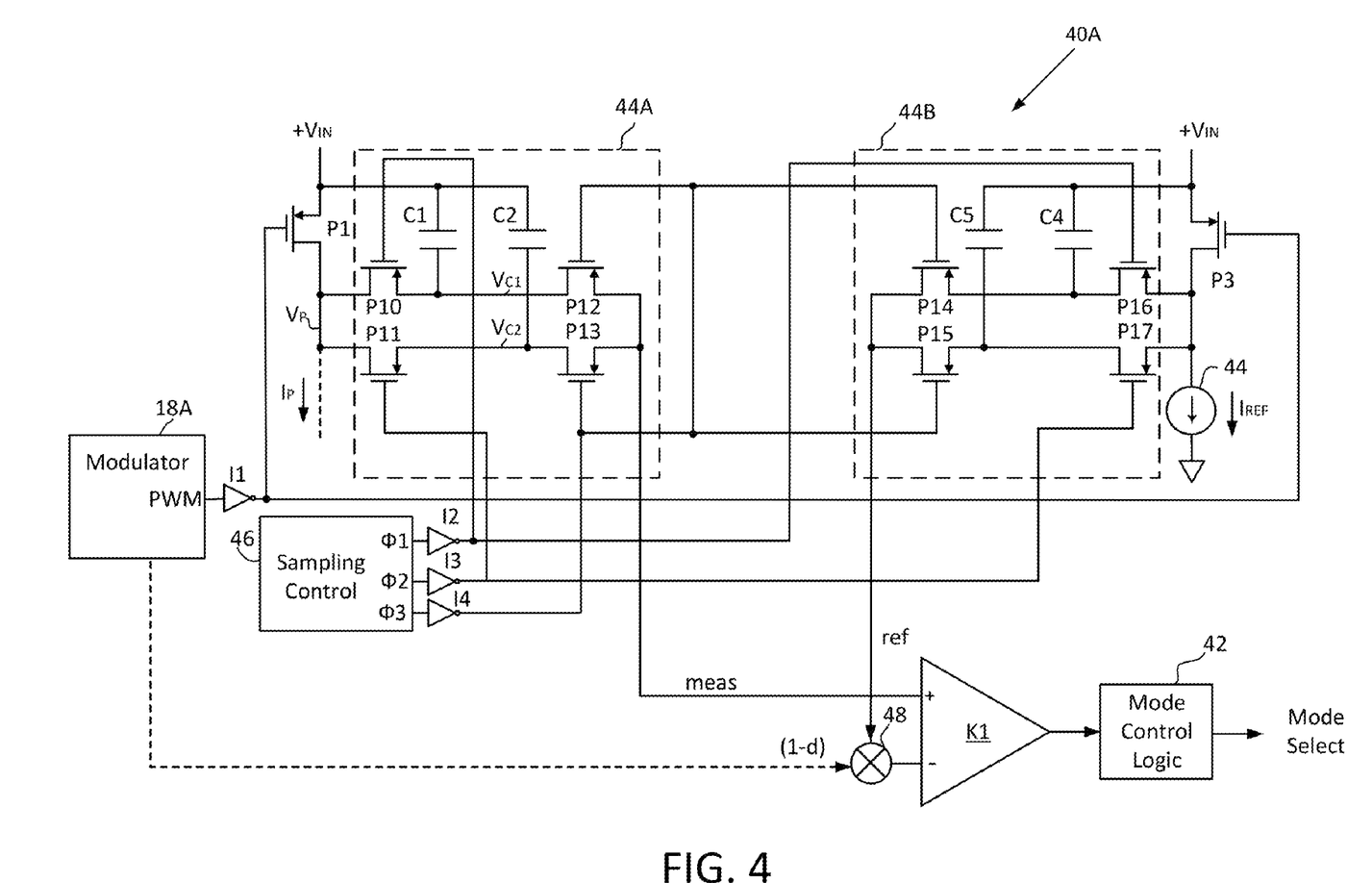
FIG. 4 is a simplified schematic diagram illustrating another example inductor charging current measurement circuit 40A that may be used to implement inductor charging current measurement circuit 16 in example switched-power delivery system 10 of FIG. 1, in accordance with an embodiment of the disclosure.

Referring now to FIG. 4, a simplified schematic diagram illustrating another example inductor charging current measurement circuit 40A that may be used to implement inductor charging current measurement circuit 16 in example switched-power delivery system 10 of FIG. 1 is shown, in accordance with an embodiment of the disclosure. A load current sampling circuit 44A is implemented in a manner similar to inductor charging current measurement circuit 30A of FIG. 3A, and includes transistors P10 and P11 that operate as sampling switches to sample the voltage across transistor P1 onto respective sampling capacitors C1 and C2 during the magnetization phase of the switching cycles of example switched power delivery system 10 of FIG. 1, when modulator 18A activates transistor P1 through an inverter I1. A sampling control block 46 generates sampling clock phases $\Phi_1$ and $\Phi_2$, which are inverted by respective inverters 12 and 13 to activate transistors P10 and P11, respectively. Sampling control block also generates clock phase $\Phi_3$ that is inverted by an inverter I4 to activate transistors P12 and P13 that couple capacitors C1 and C2 to the positive input terminal of a comparator K1. Comparator K1 thereby receives the charge-shared average voltage measurement signal meas produced across capacitors C1 and C2 during clock phase $\Phi_3$, and which represents the estimated load current over the switching cycle. Comparator K1 compares measurement signal meas to a reference current measurement signal ref that is generated by a reference current sampling circuit 44B, which is implemented in a manner similar to load current sampling circuit 40B. Reference current sampling circuit 44B samples a voltage across a transistor P3, which is matched to transistor P1, imposed by a reference current $I_{REF}$ that is generated by a reference current source 44. Reference current sampling circuit 44B includes transistors P16 and P17 that operate as sampling switches to sample the voltage across transistor P3 onto respective sampling capacitors C4 and C5 during the magnetization phase of the switching cycles of example switched power delivery system 10 of FIG. 1, when modulator 18A activates transistor P3. Sampling clock phases $\Phi_1$ and $\Phi_2$, activate transistors P10 and P11, respectively, and clock phase $\Phi_3$ activates transistors P14 and P15 to couple capacitors C4 and C5 to the negative input terminal of comparator K1 to provide a reference voltage level ref. For implementations of reference current sampling circuit 44B in a boost or buck-boost topology, a multiplier 48 is included to scale reference voltage level ref by a factor (1−d), where d is equal to a steady-state duty cycle of modulator output signal PWM. The output of comparator K1 is provided to a mode control logic block 42, which may qualify, further filter, and hold the resulting comparison provided by comparator K1 to generate mode selection control signal Mode Select. While example inductor charging current measurement circuit 40A is illustrated as high-side (PFET) voltage drop measuring circuit, a low side measurement circuit could be implemented in an equivalent manner as a low-side voltage drop measuring circuit using NFETs. Additionally, in a multi-phase converter, the sampling circuits may be duplicated for each phase and the charge sharing "dump" could be made to a common capacitor, e.g., capacitor C3.

Figure 5:
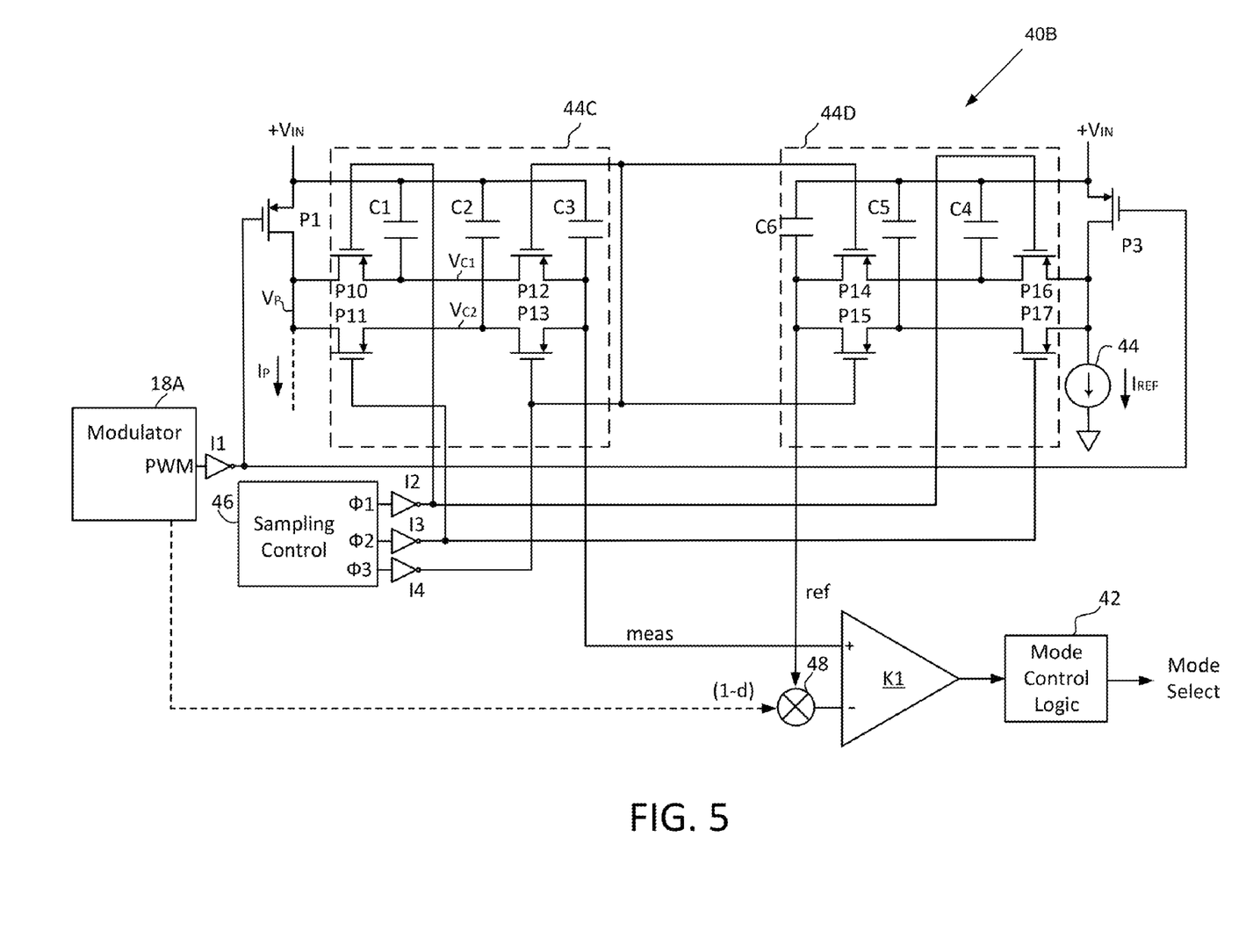
FIG. 5 is a simplified schematic diagram illustrating another example inductor charging current measurement circuit 40B that may be used to implement inductor charging current measurement circuit 16 in example switched-power delivery system 10 of FIG. 1, in accordance with an embodiment of the disclosure.

Referring now to FIG. 5, a simplified schematic diagram illustrating another example inductor charging current measurement circuit 40B that may be used to implement inductor charging current measurement circuit 16 in the example switched-power delivery system 10 of FIG. 1 is shown, in accordance with an embodiment of the disclosure. Inductor charging current measurement circuit 40B is implemented in a manner similar to inductor charging current measurement circuit 30B of FIG. 3B, and the circuit architecture and operation are is similar to inductor charging current measurement circuit 40A of FIG. 4, so only differences in circuit architecture and operation with respect to inductor charging current measurement circuit 40A of FIG. 4 will be described in further detail below. A load current sampling circuit 44C includes capacitor C3 connected across charge-shared average voltage measurement signal meas, which shares charge with capacitors C1 and C2 during clock phase $\Phi_3$. Capacitor C3 holds the value of measurement signal meas between assertions of clock phase Φ3 and allows for accumulation of the measured indication of average load current over multiple cycles, as described above with reference to FIG. 3B. Reference signal ref is generated by a reference load current sampling circuit 44D, which is implemented in a manner similar to reference current sampling circuit 44B of FIG. 4. Reference current sampling circuit 44D includes a capacitor C6 connected across charge-shared reference current measurement signal refs, which shares charge with capacitors C4 and C5 during clock phase $\Phi_3$. Capacitor C6 holds the value of reference current measurement signal ref between assertions of clock phase $\Phi_3$.

Figure 6:
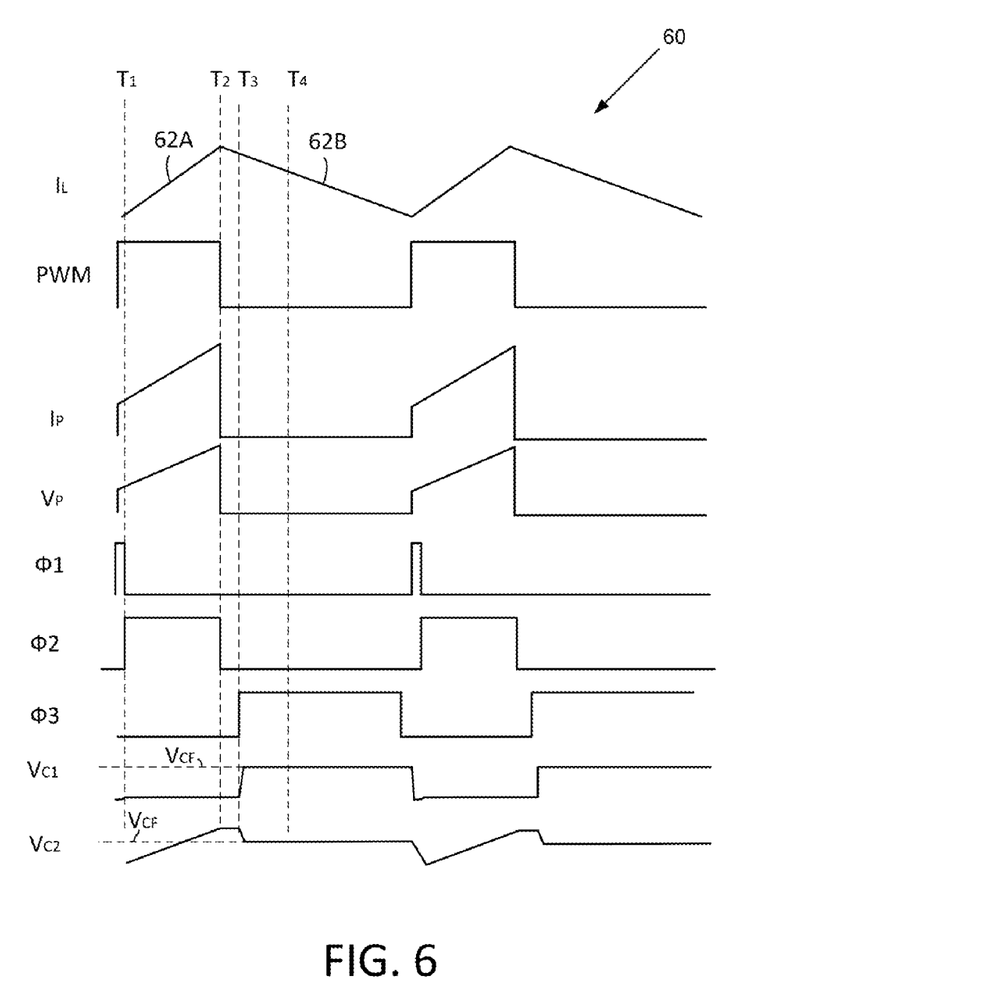
FIG. 6 is a signal waveform diagram 60 illustrating example signal waveforms within switched-power delivery system 10 of FIG. 1, in accordance with an embodiment of the disclosure.

Referring now to FIG. 6, a signal waveform diagram 60 illustrating example signal waveforms within switched-power delivery system 10 of FIG. 1 is shown, in accordance with an embodiment of the disclosure. Inductor charging current $I_L$ increases during a magnetization phase 62A, when transistor P1 s activated by modulator output signal PWM. The current through transistor P1 is represented by a current waveform $I_P$ and the voltage across transistor P1 is represented by voltage waveform $V_P$. Sampling clock phases $\Phi_1$ and $\Phi_2$, are shown, with sampling clock phase $\Phi_1$ which is illustrated as short pulse generated at the beginning of the switching cycle initiated by modulator output signal PWM and terminating at a time $T_1$, which causes capacitor C1 to retain the valley voltage of voltage waveform $V_P$ as voltage $V_{C1}$. Sampling clock phase $\Phi_2$ is illustrated as a wider pulse, which is initiated at time $T_1$ and is terminated at time $T_2$ at the end of magnetization phase 62A and before the beginning of a demagnetization phase 62B initiated by de-assertion of modulator output signal PWM. However, in accordance with other embodiments, sampling clock phase $\Phi_2$ could be started earlier, for example at the same time sampling clock phase $\Phi_1$ begins. Sampling clock phase $\Phi_2$ causes capacitor C2 to retain the peak voltage of voltage waveform $V_P$ as voltage $V_{C2}$. Clock phase $\Phi_3$ commences at a time $T_3$ shortly after the end of sampling clock phase $\Phi_2$ and causes voltages $V_{C1}$, $V_{C2}$ across capacitors C1 and C2, respectively, to assume an average voltage $V_{CF}$ of the prior values of $V_{C1}$, $V_{C2}$, and which is the value of measurement signal meas.

In summary, this disclosure shows and describes techniques and circuits for measuring an average inductor charging current in a switched-mode power supply or other switched-mode power delivery system. The power supply circuit may include an inductor that stores magnetic energy provided by the charging current and discharges to supply current to an external load, and a power output stage coupled to the inductor for generating the charging current. The power supply circuit also may include an inductor charging current measurement circuit coupled to the power output stage for measuring an average charging current through the inductor. The inductor charging current measurement circuit may include a first capacitor and a first switch that sample an output voltage of the power output stage at a first cycle time of an inductor current waveform, and may include a second capacitor and a second switch that sample the output voltage of the power output stage at a second cycle time of the inductor current waveform. The inductor charging current measurement circuit may also include at least one third switch that connects the first capacitor to the second capacitor to provide a measurement voltage indicative of the average inductor charging current by sharing charge between the first capacitor and the second capacitor to provide the measurement voltage. The measurement voltage may be indicative of an average of an estimated peak and an estimated valley of the inductor current waveform.

In some example embodiments, the first cycle time may be at an estimated peak of the inductor current waveform and the second cycle time may be at an estimated valley of the inductor current waveform. In some example embodiments, the inductor charging current measurement circuit may provide the measurement voltage for individual cycles of the inductor current waveform. In some example embodiments, the inductor charging current measurement circuit may further include a third capacitor and the at least one third switch may include a pair of switches that respectively couple the first capacitor and the second capacitor to the third capacitor, so that wherein the third capacitor may provide the measurement voltage indicative of the output current provided to the external load by sharing charge accumulated on the first capacitor and the second capacitor. In some example embodiments, the inductor charging current measurement circuit may provide the measurement voltage over multiple cycles of the inductor current waveform, so that the measurement voltage provided by the third capacitor may represent an average of the estimated peak and the estimated valley of the inductor current waveform over the multiple cycles of the inductor current waveform.

In some example embodiments, a series combination of the first capacitor and the first switch and a series combination of the second capacitor and the second switch may both be coupled across a channel of a driver transistor, so that the sampled output voltage of the power output stage is a drain-source voltage across the channel of the driver transistor. In some example embodiments, the circuit may include a reference current generating stage for generating a reference current waveform, and the measurement voltage may be a first measurement voltage. The inductor charging current measurement circuit may further include a fourth capacitor and a fourth switch that samples an output voltage of the reference current generating stage at the first cycle time of the inductor current waveform, and fifth capacitor and a fifth switch that sample the output voltage of the reference current generating stage at the second cycle time of the inductor current waveform. The reference current generating stage may further include at least one sixth switch that connects the fourth capacitor to the fifth capacitor to provide a second measurement voltage indicative of the reference current by sharing charge between the fourth capacitor and the fifth capacitor to provide a second measurement voltage indicative of an average of an estimated peak and an estimated valley of the reference current waveform.

In some example embodiments, the inductor charging current measurement circuit may further include a third capacitor, and the at least one third switch may include a first pair of switches that respectively couple the first capacitor and the second capacitor to the third capacitor, and the third capacitor may provide the first measurement voltage indicative of the output current provided to the external load by sharing charge accumulated on the first capacitor and the second capacitor. The inductor charging current measurement circuit may further include a sixth capacitor, and the at least one sixth switch may include a second pair of switches that respectively couple the fourth capacitor and the fifth capacitor to the sixth capacitor, and the sixth capacitor may provide the second measurement voltage indicative of the reference current by sharing charge accumulated on the fourth capacitor and the fifth capacitor. In some example embodiments, the inductor charging current measurement circuit may provide the first measurement voltage and the second measurement voltage over multiple cycles of the inductor current waveform, so that the first measurement voltage provided by the third capacitor represents an average of the estimated peak and the estimated valley of the inductor current waveform over the multiple cycles of the inductor current waveform, and wherein the second measurement voltage provided by the sixth capacitor represents an average of the estimated peak and the estimated valley of a reference current waveform over the multiple cycles of the inductor current waveform. In some example embodiments, the power supply circuit may further include a comparator that compares the first measurement voltage to the second measurement voltage to generate a control indication and a control circuit that controls an operating mode of the power supply current in conformity with the control indication.

While the disclosure has shown and described particular embodiments of the techniques disclosed herein, it will be understood by those skilled in the art that the foregoing and other changes in form, and details may be made therein without departing from the spirit and scope of the disclosure. For example, the techniques shown above may be applied to another type of output stage and system.

What is claimed is:

1. A power supply circuit, comprising:
   an inductor that stores magnetic energy provided by a charging current and discharges to supply current to an external load;
   a power output stage coupled to the inductor for generating the charging current;
   an inductor charging current measurement circuit coupled to the power output stage for measuring an average charging current through the inductor, wherein the inductor charging current measurement circuit includes a first capacitor and a first switch that sample an output voltage of the power output stage at a first cycle time of an inductor current waveform, a second capacitor and a second switch that sample the output voltage of the power output stage at a second cycle time of the inductor current waveform, and at least one third switch that connects the first capacitor to the second capacitor to provide a measurement voltage indicative of the average inductor charging current by sharing charge between the first capacitor and the second capacitor to provide the measurement voltage, wherein the measurement voltage is indicative of an average of an estimated peak and an estimated valley of the inductor current waveform.

2. The power supply circuit of claim 1, wherein the first cycle time is at the estimated peak of the inductor current waveform, and wherein the second cycle time is at the estimated valley of the inductor current waveform.

3. The power supply circuit of claim 1, wherein the inductor charging current measurement circuit provides the measurement voltage for individual cycles of the inductor current waveform.

4. The power supply circuit of claim 1, wherein the inductor charging current measurement circuit further comprises a third capacitor, wherein the at least one third switch comprises a pair of switches that respectively couple the first capacitor and the second capacitor to the third capacitor, and wherein the third capacitor provides the measurement voltage indicative of the output current provided to the external load by sharing charge accumulated on the first capacitor and the second capacitor.

5. The power supply circuit of claim 4, wherein the inductor charging current measurement circuit provides the measurement voltage over multiple cycles of the inductor current waveform, so that the measurement voltage provided by the third capacitor represents an average of the estimated peak and the estimated valley of the inductor current waveform over the multiple cycles of the inductor current waveform.

6. The power supply circuit of claim 1, wherein a series combination of the first capacitor and the first switch and a series combination of the second capacitor and the second switch are both coupled across a channel of a driver transistor, whereby the sampled output voltage of the power output stage is a drain-source voltage across the channel of the driver transistor.

7. The power supply circuit of claim 1, further comprising a reference current generating stage for generating a reference current waveform, wherein the measurement voltage is a first measurement voltage and wherein the inductor charging current measurement circuit further comprises:
   a fourth capacitor and a fourth switch that sample an output voltage of the reference current generating stage at the first cycle time of the inductor current waveform; and
   a fifth capacitor and a fifth switch that sample the output voltage of the reference current generating stage at the second cycle time of the inductor current waveform, and at least one sixth switch that connects the fourth capacitor to the fifth capacitor to provide a second measurement voltage indicative of a reference current by sharing charge between the fourth capacitor and the fifth capacitor to provide a second measurement voltage indicative of an average of the estimated peak and the estimated valley of the reference current waveform.

8. The power supply circuit of claim 7, wherein the inductor charging current measurement circuit further comprises:
   a third capacitor, wherein the at least one third switch comprises a first pair of switches that respectively couple the first capacitor and the second capacitor to the third capacitor, and wherein the third capacitor provides the first measurement voltage indicative of the average inductor charging current by sharing charge accumulated on the first capacitor and the second capacitor; and
   a sixth capacitor, wherein the at least one sixth switch comprises a second pair of switches that respectively couple the fourth capacitor and the fifth capacitor to the sixth capacitor, and wherein the sixth capacitor provides the second measurement voltage indicative of a reference current by sharing charge accumulated on the fourth capacitor and the fifth capacitor.

9. The power supply circuit of claim 8, wherein the inductor charging current measurement circuit provides the first measurement voltage and the second measurement voltage over multiple cycles of the inductor current waveform, so that the first measurement voltage provided by the third capacitor represents an average of the estimated peak and the estimated valley of the inductor current waveform over the multiple cycles of the inductor current waveform, and wherein the second measurement voltage provided by the sixth capacitor represents an average of the estimated peak and the estimated valley of the reference current waveform over the multiple cycles of the inductor current waveform.

10. The power supply circuit of claim 9, further comprising:
    a comparator that compares the first measurement voltage to the second measurement voltage to generate a control indication; and a control circuit that controls an operating mode of the power supply current in conformity with the control indication.

11. A method of estimating an average inductor charging current in a power supply circuit, comprising:
   storing magnetic energy provided by a charging current in an inductor of the power supply circuit;
   discharging the stored magnetic energy to supply current to an external load;
   generating the charging current from a power output stage coupled to the output terminal;
   estimating the average inductor charging current, by sampling an output voltage of the power output stage through a first switch onto a first capacitor at a first cycle time of an inductor current waveform of the power supply circuit, sampling the output voltage of the power output stage through a second switch onto a second capacitor at a second cycle time of the inductor current waveform; and
   connecting the first capacitor to the second capacitor with at least one third switch to provide a measurement voltage indicative of the output current provided to the external load by sharing charge between the first capacitor and the second capacitor to provide the measurement voltage, wherein the measurement voltage is indicative of an average of an estimated peak and an estimated valley of the inductor current waveform.

12. The method of claim 11, wherein the first cycle time is at the estimated peak of the inductor current waveform, and wherein the second cycle time is at the estimated valley of the inductor current waveform.

13. The method of claim 1, wherein the connecting of the first capacitor and the second capacitor provides the measurement voltage for individual cycles of the inductor current waveform.

14. The method of claim 11, wherein the at least one third switch comprises a pair of switches, and wherein the connecting couples the first capacitor and the second capacitor to a third capacitor through the pair of switches, and wherein the third capacitor provides the measurement voltage indicative of the output current provided to the external load by sharing charge accumulated on the first capacitor and the second capacitor.

15. The method of claim 14, wherein the connecting accumulates the measurement voltage over multiple cycles of the inductor current waveform, so that the measurement voltage provided by the third capacitor represents an average of the estimated peak and the estimated valley of the inductor current waveform over the multiple cycles of the inductor current waveform.

16. The method of claim 11, wherein a series combination of the first capacitor and the first switch and a series combination of the second capacitor and the second switch are both coupled across a channel of a driver transistor, whereby the sampled output voltage of the power output stage is a drain-source voltage across the channel of the driver transistor.

17. The method of claim 11, wherein the connecting is a first connecting, wherein the measurement voltage is a first measurement voltage, and wherein the method further comprises:
   generating a reference current waveform;
   sampling an output voltage of a reference current generating stage that generates the reference current waveform through a fourth switch onto a fourth capacitor at the first cycle time of the inductor current waveform; and
   sampling the output voltage of the reference current generating stage with a fifth switch onto a fifth capacitor at the second cycle time of the inductor current waveform; and
   second connecting the fourth capacitor to the fifth capacitor to provide a second measurement voltage indicative of a reference current by sharing charge between the fourth capacitor and the fifth capacitor to provide a second measurement voltage indicative of an average of the estimated peak and the estimated valley of the reference current waveform.

18. The method of claim 17, wherein the first connecting couples the first capacitor and the second capacitor to a third capacitor through a first pair of switches, wherein the third capacitor provides the measurement voltage indicative of the output current provided to the external load by sharing charge accumulated on the first capacitor and the second capacitor, and wherein the second connecting comprises connecting the fourth capacitor and the fifth capacitor to a sixth capacitor to provide the second measurement voltage indicative of the reference current by sharing charge accumulated on the fourth capacitor and the fifth capacitor.

19. The method of claim 18, wherein the first connecting and the second connecting provide the first measurement voltage and the second measurement voltage over multiple cycles of the inductor current waveform, so that the first measurement voltage provided by the third capacitor represents an average of the estimated peak and the estimated valley of the inductor current waveform over the multiple cycles of the inductor current waveform, and wherein the second measurement voltage provided by the sixth capacitor represents an average of the estimated peak and the estimated valley of the reference current waveform over the multiple cycles of the inductor current waveform.

20. The method of claim 19, further comprising:
   comparing the first measurement voltage to the second measurement voltage to generate a control indication; and
   controlling an operating mode of the power supply current in conformity with the control indication.

* * * * *

UNITED STATES PATENT AND TRADEMARK OFFICE
CERTIFICATE OF CORRECTION

| | | |
|---|---|---|
| PATENT NO. | : 12,381,468 B1 | Page 1 of 1 |
| APPLICATION NO. | : 18/204595 | |
| DATED | : August 5, 2025 | |
| INVENTOR(S) | : Alevoor et al. | |

It is certified that error appears in the above-identified patent and that said Letters Patent is hereby corrected as shown below:

On the Title Page

Item (72), under "Inventors", in Column 1, Line 6, delete "Phoeniz, AZ (US)" and insert -- Phoenix, AZ (US) --, therefor.

In the Specification

In Column 3, Line 48, delete "SMIPS" and insert -- SMPS --, therefor.

In Column 3, Line 55, delete "SMIPS" and insert -- SMPS --, therefor.

In Column 3, Line 64, delete "SMIPS" and insert -- SMPS --, therefor.

In Column 4, Line 7, delete "(SMIPS)," and insert -- (SMPS), --, therefor.

In Column 4, Line 62, delete "current L" and insert -- current $I_L$ --, therefor.

In Column 6, Line 5, delete "12 and 13" and insert -- I2 and I3 --, therefor.

In Column 6, Line 57, delete "are is" and insert -- are --, therefor.

In Column 7, Line 16, delete "P1 s" and insert -- P1 is --, therefor.

Signed and Sealed this
Twenty-eighth Day of October, 2025

John A. Squires
*Director of the United States Patent and Trademark Office*